(12) United States Patent
Nawracaj et al.

(10) Patent No.: US 10,865,305 B2
(45) Date of Patent: Dec. 15, 2020

(54) METHOD OF CURING A CURED-IN-PLACE LINER

(71) Applicant: PipeFusion CIPP Corporation, Forest Park, IL (US)

(72) Inventors: Richard E. Nawracaj, Burr Ridge, IL (US); Gabriel Urbieta, Chicago, IL (US); Radames Dejesus, Forest Park, IL (US)

(73) Assignee: PipeFusion CIPP Corporation, Forest Park, IL (US)

( * ) Notice: Subject to any disclaimer, the term of this patent is extended or adjusted under 35 U.S.C. 154(b) by 0 days.

(21) Appl. No.: 16/885,611

(22) Filed: May 28, 2020

(65) Prior Publication Data
US 2020/0291224 A1 Sep. 17, 2020

Related U.S. Application Data

(62) Division of application No. 16/125,077, filed on Sep. 7, 2018, now Pat. No. 10,696,839.

(51) Int. Cl.
*C08L 63/00* (2006.01)
*C08J 3/075* (2006.01)
*C08K 5/357* (2006.01)

(52) U.S. Cl.
CPC .............. *C08L 63/00* (2013.01); *C08J 3/075* (2013.01); *C08K 5/357* (2013.01); *C08J 2363/00* (2013.01); *C08L 2203/18* (2013.01)

(58) Field of Classification Search
None
See application file for complete search history.

(56) References Cited

U.S. PATENT DOCUMENTS

| | | |
|---|---|---|
| 3,792,016 A | 2/1974 | Hill et al. |
| 9,738,750 B2 | 8/2017 | Lal et al. |
| 2007/0116961 A1 | 5/2007 | Connell et al. |
| 2010/0184925 A1 | 7/2010 | Wittenbecher et al. |
| 2010/0227981 A1 | 9/2010 | Chiba et al. |
| 2014/0243456 A1 | 8/2014 | Lal et al. |
| 2014/0303342 A1 | 10/2014 | Lal et al. |
| 2016/0017087 A1 | 1/2016 | Lal et al. |
| 2018/0171067 A1 | 6/2018 | Patel et al. |
| 2020/0079953 A1 | 3/2020 | Nawracaj et al. |

FOREIGN PATENT DOCUMENTS

WO WO 2020/050858 A1 3/2020

OTHER PUBLICATIONS

U.S. Appl. No. 16/216,311, filed Dec. 11, 2018.
U.S. Appl. No. 16/125,077, filed Sep. 7, 2018.
(Continued)

*Primary Examiner* — Megan McCulley
(74) *Attorney, Agent, or Firm* — Leydig, Voit & Mayer, Ltd.

(57) ABSTRACT

Disclosed is a curable composition with enhanced curing time at ambient temperatures, the curable composition including (a) a resin, e.g., 4,4'-isopropylidenediphenol-epichlorohydrin copolymer and (b) one or more curing agents, wherein a ratio of a weight percentage of the resin to a weight percentage of the curing agent or curing agents is from about 12:1 to about 15:1. Also disclosed is a method of curing a cured-in-place liner, wherein the cured-in-place liner contains the above curable composition.

20 Claims, 1 Drawing Sheet

(56) References Cited

OTHER PUBLICATIONS

"Ancamine® 2910 Curing Agent," *Air Products*, Product Description, 125-15-040-US, 2015.
"ANCAMINE® 2910 Curing Agent," *Air Products*, Safety Data Sheet, Version 0.1, Revised Apr. 14, 2015.
"EPODIL 748 Diluent," *Air Products*, Safety Data Sheet, Version 2.2, Revised Sep. 9, 2015.
"Epoxy Curing Agents and Modifiers: Epodil® 748 Reactive Diluent," *Evonik Corporation*, Product Description, May 2017.
"EPON™ Resin 828," *Hexion*, Safety Data Sheet, Version 19.0, Revised Feb. 3, 2015.
"EPON™ Resin 828," *Momentive*, Technical Data Sheet, Revised May 15, 2014.
European Patent Office, International Search Report in International Application No. PCT/US2018/050008 dated (Jun. 17, 2019).
European Patent Office, Written Opinion in International Application No. PCT/US2018/050008 dated (Jun. 17, 2019).

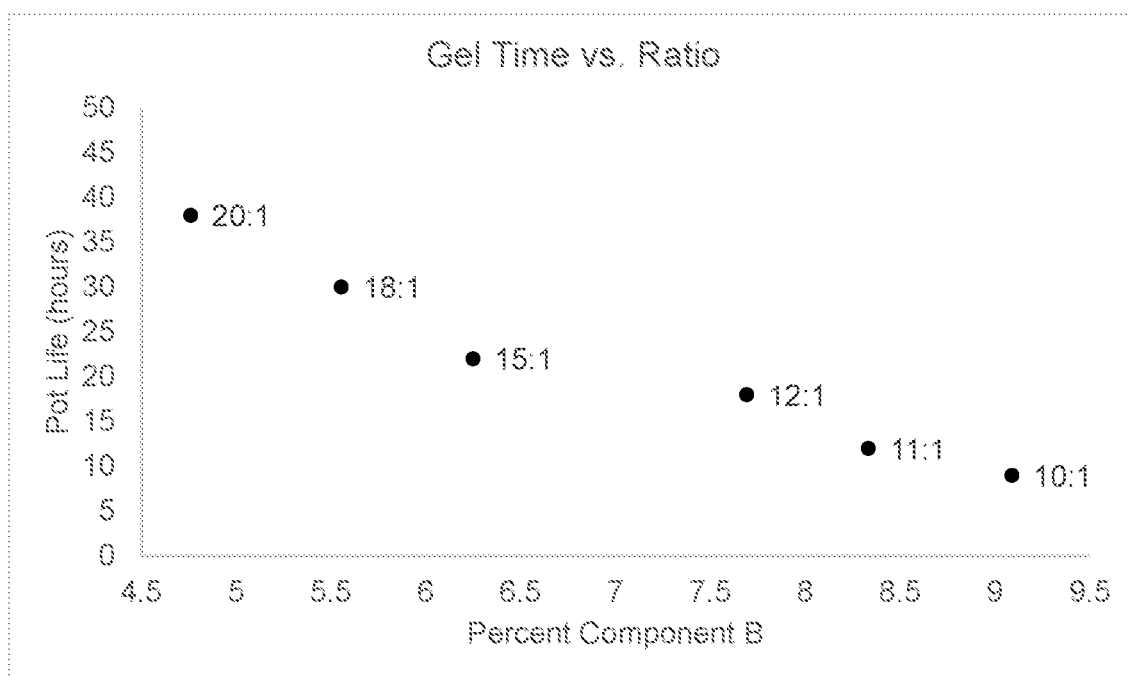

METHOD OF CURING A CURED-IN-PLACE LINER

CROSS-REFERENCE TO A RELATED APPLICATION

This application is a Divisional of co-pending U.S. patent application Ser. No. 16/125,077, filed Sep. 7, 2018, the disclosure of which is incorporated herein in its entirety for all purposes.

BACKGROUND OF THE INVENTION

Curable compositions comprising an epoxy resin and a curing agent are well known in the art. One common application for curable compositions is in the process of repairing existing pipelines (e.g., sewer or chemical pipelines). During this process, a curable composition filled liner is inserted or pulled into a damaged pipe. Once in place, the curable composition is cured with a hot water bladder or steam to form a tight-fitting replacement pipe. The resulting product, deemed a cured-in-place pipe, allows for seamless repair of a pipe with little to no excavation necessary, thereby making the process more cost effective than the alternative methods.

For a curable composition to be adequately applied to cured-in-place applications, the curable composition must (i) have a sufficient latency period (i.e., time to form a gel) to be manageable while inserting into a damaged pipe, (ii) have enough structural integrity to fill the pipe and maintain conformity, and (iii) efficiently cure at temperatures compatible with a hot water bladder or steam. Conventional methods for providing a curable composition with desirable qualities (i), (ii), and (iii), include changing the structure of the epoxy resin or the curing agent, adding a diluent to reduce viscosity and increase latency periods, and adding an accelerator to reduce curing times.

Existing curable compositions provide inadequate results for one or more of the desirable qualities (i), (ii), and (iii). In addition, economic production is also needed. For example, conventional curable compositions typically require high levels of curing agent or accelerator to efficiently cure at temperatures compatible with a hot water bladder or steam, or require a diluent to reduce viscosity and have a sufficient latency period (i.e., time to form a gel) to be manageable while inserting into a damaged pipe. Such additional components increase costs associated with materials and equipment necessary for production of the curable composition.

Thus, there remains an unmet need in the art for improved curable compositions that (i) have a sufficient latency period (i.e., time to form a gel) to permit inserting into a damaged pipe, (ii) have sufficient structural integrity to fill the pipe and maintain conformity, and/or (iii) efficiently cure at temperatures compatible with a hot water bladder or steam.

BRIEF SUMMARY OF THE INVENTION

The invention provides a curable composition comprising, consisting essentially of, or consisting of, (a) a resin comprising 4,4'-isopropylidenediphenol-epichlorohydrin copolymer and (b) one or more curing agents, wherein a ratio of a weight percentage of the resin to a weight percentage of the curing agent or curing agents is from about 12:1 to about 15:1.

The invention further provides a curable composition comprising, consisting essentially of, or consisting of, (a) a resin comprising 4,4'-isopropylidenediphenol-epichlorohydrin copolymer and (b) one or more curing agents wherein at least one of the one or more curing agents is of Formula (II):

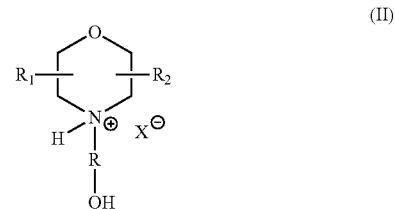

(II)

wherein R is a $C_1$-$C_6$ alkylene chain, wherein the hydroxyl group may be attached to any of the carbon atoms of the alkylene chain; $R_1$ and $R_2$ are each independently hydrogen, hydroxyl, or an optionally substituted $C_1$-$C_{20}$ alkyl, $C_2$-$C_{20}$ alkenyl, $C_1$-$C_{20}$ haloalkyl, $C_2$-$C_{20}$ haloalkenyl, or $C_6$-$C_{10}$ aryl; and X is a carboxylate anion, wherein a ratio of a weight percentage of the resin to a weight percentage of the curing agent or curing agents is from about 12:1 to about 15:1.

The invention also provides a method of curing a cured-in-place liner, wherein the method comprises: (i) placing the cured-in-place liner in a pipe and (ii) heating the cured-in-place liner, wherein the cured-in-place liner contains a curable composition comprising, consisting essentially of, or consisting of, (a) a resin comprising 4,4'-isopropylidene-diphenol-epichlorohydrin copolymer and (b) one or more curing agents, wherein a ratio of a weight percentage of the resin to a weight percentage of the curing agent or curing agents is from about 12:1 to about 15:1.

BRIEF DESCRIPTION OF THE DRAWINGS

The FIGURE shows the pot life (i.e., latency or gel time) at a temperature of 21° C. exhibited by the curable compositions set forth in the Example.

DETAILED DESCRIPTION OF THE INVENTION

The invention provides a curable composition comprising, consisting essentially of, or consisting of, (a) a resin comprising 4,4'-isopropylidenediphenol-epichlorohydrin copolymer and (b) one or more curing agents, wherein a ratio of a weight percentage of the resin to a weight percentage of the curing agent or curing agents is from about 12:1 to about 15:1.

The inventive curable composition described herein, comprising a ratio of a weight percentage of the resin to a weight percentage of the curing agent or curing agents is from about 12:1 to about 15:1, provides a sufficient latency period (i.e., time to form a gel) to be manageable while inserting into a damaged pipe, has enough structural integrity to fill the pipe and maintain conformity, and efficiently cures at temperatures compatible with a hot water bladder or steam. In other words, the inventive curable composition is (i) not too viscous prior to curing such that the composition is manageable and maneuverable, (ii) not too flowable (i.e., low viscosity) prior to curing such that the composition maintains structural integrity, and (iii) has the desirable ratio of resin to curing agent such that the composition has an ideal latency period and curing time and temperature.

The curable composition comprises a resin, wherein the resin comprises a 4,4'-isopropylidenediphenol-epichlorohydrin copolymer. As used herein, the term "4,4'-isopropylidenediphenol-epichlorohydrin copolymer" refers to a polymer derived from monomers 4,4'-isopropylidenediphenol ("bisphenol-A") and epichlorohydrin. As used herein, "derived" when referring to a polymer, means that the polymer has been synthesized from a formulation comprising said reagents or monomers. Accordingly, the polymer contains monomer units that are substantially the same structure of the monomer from which the monomer unit was made. For example, during the formation of a 4,4'-isopropylidenediphenol-epichlorohydrin copolymer, all or substantially all of the epichlorohydrin is transformed such that it no longer has the chlorine atom and/or the epoxide group.

The 4,4'-isopropylidenediphenol-epichlorohydrin copolymer can have monomer units derived from monomers, 4,4'-isopropylidenediphenol and epichlorohydrin, in any suitable ratio. The 4,4'-isopropylidenediphenol-epichlorohydrin copolymer can exist as an alternating copolymer, a random copolymer, a block copolymer, or a graft copolymer. Typically, the 4,4'-isopropylidenediphenol-epichlorohydrin copolymer is an alternating copolymer. In an embodiment, the monomer units derived from 4,4'-isopropylidenediphenol and epichlorohydrin can be present in a molar ratio of about 1:1.

The 4,4'-isopropylidenediphenol-epichlorohydrin copolymer can have any suitable molecular weight, e.g., weight average molecular weight, prior to curing. The 4,4'-isopropylidenediphenol-epichlorohydrin copolymer can have a weight average molecular weight of about 10,000 Da or less, for example, about 8,000 Da or less, about 6,000 Da or less, about 5,000 Da or less, about 4,000 Da or less, about 2,000 Da or less, or about 1,000 Da or less. Alternatively, or in addition, the 4,4'-isopropylidenediphenol-epichlorohydrin copolymer can have a weight average molecular weight of about 400 Da or more, for example, about 500 Da or more, about 600 Da or more, about 700 Da or more, about 800 Da or more, or about 900 Da or more. Thus, the 4,4'-isopropylidenediphenol-epichlorohydrin copolymer can have a weight average molecular weight bounded by any two of the aforementioned endpoints. For example, the 4,4'-isopropylidenediphenol-epichlorohydrin copolymer can have a weight average molecular weight of from about 400 Da to about 10,000 Da, from about 400 Da to about 8,000 Da, from about 400 Da to about 6,000 Da, from about 400 Da to about 5,000 Da, from about 400 Da to about 4,000 Da, from about 400 Da to about 2,000 Da, from about 400 Da to about 1,000 Da, from about 500 Da to about 10,000 Da, from about 600 Da to about 10,000 Da, from about 700 Da to about 10,000 Da, from about 800 Da to about 10,000 Da, from about 900 Da to about 10,000 Da, or from about 800 Da to about 5,000 Da.

In an embodiment, the 4,4'-isopropylidenediphenol-epichlorohydrin copolymer is of the formula:

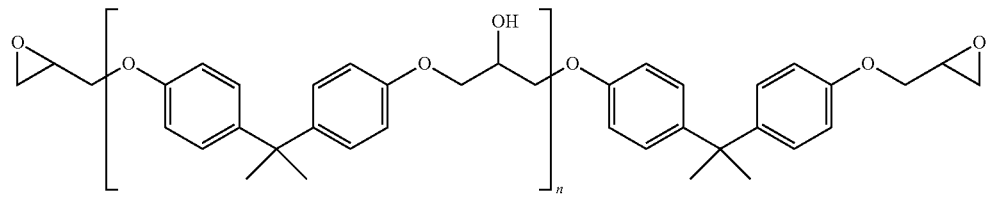

wherein n is an integer from 0 to about 20 (e.g., from 0 to about 10, from 0 to about 5, from 1 to about 20, from 1 to about 10, from 1 to about 5, from 2 to about 20, from 2 to about 10, or from 2 to about 5). In preferred embodiments, n is an integer from 0 to about 10. In some embodiments, the 4,4'-isopropylidenediphenol-epichlorohydrin copolymer is EPON™ Resin 828, commercially available from Hexion Inc. (Columbus, Ohio).

The resin can comprise any suitable amount of 4,4'-isopropylidenediphenol-epichlorohydrin copolymer. The resin can comprise about 80 wt. % or more of the 4,4'-isopropylidenediphenol-epichlorohydrin copolymer, for example, about 82 wt. % or more, about 84 wt. % or more, about 85 wt. % or more, about 86 wt. % or more, about 88 wt. % or more, about 90 wt. % or more, about 92 wt. % or more, about 94 wt. % or more, or about 95 wt. % or more. Alternatively, or in addition, the resin can comprise 100 wt. % or less of the 4,4'-isopropylidenediphenol-epichlorohydrin copolymer, for example, 99.9 wt. % or less, 99.5 wt. % or less, about 99 wt. % or less, about 98 wt. % or less, about 97 wt. % or less, about 96 wt. % or less, or about 95 wt. % or less. Thus, the resin can comprise the 4,4'-isopropylidenediphenol-epichlorohydrin copolymer in an amount bounded by any two of the aforementioned endpoints. For example, the resin can comprises from about 80 wt. % to 100 wt. % 4,4'-isopropylidenediphenol-epichlorohydrin copolymer, from about 82 wt. % to 100 wt. %, from about 84 wt. % to 100 wt. %, from about 85 wt. % to 100 wt. %, from about 86 wt. % to 100 wt. %, from about 88 wt. % to 100 wt. %, from about 90 wt. % to 100 wt. %, from about 92 wt. % to 100 wt. %, from about 94 wt. % to 100 wt. %, from about 95 wt. % to 100 wt. %, from about 80 wt. % to 99.9 wt. %, from about 80 wt. % to 99.5 wt. %, from about 80 wt. % to about 99 wt. %, from about 85 wt. % to about 95 wt. %, from about 90 wt. % to about 99.9 wt. %, from about 90 wt. % to about 99.5 wt. %, from about 90 wt. % to about 99 wt. %, from about 90 wt. % to about 95 wt. %, or from about 95 wt. % to 99.9 wt. %.

The 4,4'-isopropylidenediphenol-epichlorohydrin copolymer can have any suitable intrinsic viscosity prior to curing. In some embodiments, the 4,4'-isopropylidenediphenol-epichlorohydrin copolymer has an intrinsic viscosity of from about 5,000 cps to about 20,000 cps (e.g., from about 5,000 cps to about 15,000 cps, from about 5,000 cps to about 12,000 cps, from about 10,000 cps to about 20,000 cps, from about 10,000 cps to about 15,000 cps, from about 10,000 cps to about 14,000 cps, from about 10,000 cps to about 12,000 cps, or from about 11,000 cps to about 12,000 cps) when stored at a temperature of 22° C. In preferred embodiments, the 4,4'-isopropylidenediphenol-epichlorohydrin copolymer has an intrinsic viscosity of from about 11,000 cps to about 12,000 cps when stored at a temperature of 22° C.

In preferred embodiments, 4,4'-isopropylidenediphenol-epichlorohydrin copolymer is the only component of the resin. In such embodiments, the resin is free of any other component (i.e., other than 4,4'-isopropylidenediphenol-epichlorohydrin copolymer) that has a material effect on the curable composition (e.g., a diluent or a curing agent such as dicyandiamide). In certain embodiments, the resin consists essentially of or consists of 4,4'-isopropylidenediphenol-epichlorohydrin copolymer. When the resin consists essentially of 4,4'-isopropylidenediphenol-epichlorohydrin copolymer, other components present in the resin can be the starting materials necessary for the formation of the 4,4'-isopropylidenediphenol-epichlorohydrin copolymer. When the resin consists of 4,4'-isopropylidenediphenol-epichlorohydrin copolymer, 4,4'-isopropylidenediphenol-epichlorohydrin copolymer is the only component of the resin.

In some embodiments, the curable composition further comprises a diluent. The diluent can be any substance used to modify the viscosity of the curable composition. For example, the diluent can be a monofunctional epoxide. For example, the monofunctional epoxide can be an epoxide of ethylene, propylene, butylene, styrene, cyclohexene, etc., and combinations thereof. In some embodiments, the diluent is a glycidyl ether of a monofunctional epoxide. For example, the diluent can be a glycidyl ether of any $C_4$ to $C_{14}$ aliphatic or aromatic alcohols (e.g., phenol, cresols, tert-butylphenol, butanol, or 2-ethylhexanol).

In certain embodiments, the diluent is a monofunctional glycidyl ether. As used herein, the term "monofunctional glycidyl ether" refers to a compound comprising an ether moiety, wherein the ether moiety has been formed between the primary alcohol substituent of glycidol and the hydroxyl group of an alkyl alcohol, aryl alcohol, arylalkyl alcohol, heteroaryl alcohol, or heteroalkyl alcohol. In certain embodiments, the monofunctional glycidyl ether is a compound comprising an ether moiety, wherein the ether moiety has been formed between the primary alcohol substituent of glycidol and a straight or branched, saturated or unsaturated alkyl alcohol. In preferred embodiments, the monofunctional glycidyl ether is a compound comprising an ether moiety, wherein the ether moiety has been formed between the primary alcohol substituent of glycidol and $C_{12}$-$C_{14}$ alkyl alcohol ("alkyl $C_{12}$-$C_{14}$ glycidyl ether"). In some embodiments, the monofunctional glycidyl ether is of the formula

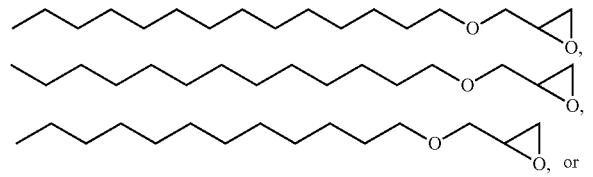

combinations thereof. For example, the monofunctional glycidyl ether can be EPODIL® 748, commercially available from Evonik Industries (Essen, North Rhine-Westphalia, Germany).

The curable composition can comprise any suitable amount of diluent (e.g., monofunctional glycidyl ether). The curable composition can comprise 0.1 wt. % or more of the diluent, for example, 0.5 wt. % or more, about 1 wt. % or more, about 2 wt. % or more, about 3 wt. % or more, about 4 wt. % or more, or about 5 wt. % or more. Alternatively, or in addition, the curable composition can comprise about 20 wt. % or less of the diluent, for example, about 18 wt. % or less, about 16 wt. % or less, about 15 wt. % or less, about 14 wt. % or less, about 12 wt. % or less, about 10 wt. % or less, about 8 wt. % or less, about 6 wt. % or less, or about 5 wt. % or less. Thus, the curable composition can comprise the diluent in an amount bounded by any two of the aforementioned endpoints. For example, the curable composition can comprise up to about 20 wt. % diluent, up to about 18 wt. %, up to about 16 wt. %, up to about 15 wt. %, up to about 14 wt. %, up to about 12 wt. %, up to about 10 wt. %, up to about 8 wt. %, up to about 6 wt. %, up to about 5 wt. %, from 0.1 wt. % to about 20 wt. %, from 0.1 wt. % to about 10 wt. %, from 0.1 wt. % to about 5 wt. %, from 0.5 wt. % to about 20 wt. %, from about 1 wt. % to about 20 wt. %, from about 5 wt. % to about 15 wt. %, from 0.1 wt. % to about 10 wt. %, from about 0.5 wt. % to about 10 wt. %, from about 1 wt. % to about 10 wt. %, from about 5 wt. % to about 10 wt. %, from about 0.1 wt. % to about 5 wt. %, or from about 1 wt. % to about 5 wt. %. In some embodiments, the curable composition comprises from 0.1 wt. % to about 20 wt. % diluent. In certain embodiments, the curable composition comprises from about 1 wt. % to about 10 wt. % diluent.

The curable composition comprises one or more curing agents. As used herein, the term "curing agent" refers to any compound capable of reacting with the resin to produce a networked polymer comprising polyether groups. Generally, the curable composition comprises the resin and the one or more curing agents wherein a ratio of a weight percentage of the resin to a weight percentage of the curing agent or curing agents is from about 12:1 to about 15:1 (e.g., about 12:1 to about 14:1, about 12:1 to about 13:1, about 13:1 to about 15:1, about 14:1 to about 15:1, about 13:1 to about 14:1, about 12:1, about 13:1, about 14:1, or about 15:1). In certain embodiments, the weight percentage ratio of the resin to the one or more curing agents is from about 12:1 to about 14:1. In preferred embodiments, the weight percentage ratio of the resin to the one or more curing agents is about 12:1.

Typically, the curing agent is a carboxylic acid salt of a tertiary amine. In some embodiments, at least one of the one or more curing agents is of Formula (I):

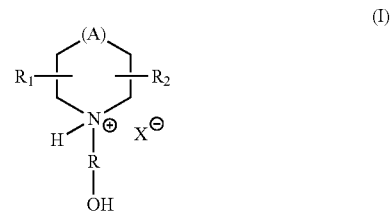

wherein A is —O—, —CH$_2$—, or —NR'—, R' is hydrogen or an optionally substituted $C_1$-$C_{10}$ alkyl or $C_2$-$C_{10}$ alkenyl group; R is a $C_1$-$C_6$ alkylene chain, wherein the hydroxyl group can be attached to any of the carbon atoms of the alkylene chain; $R_1$ and $R_2$ are each independently hydrogen, hydroxyl, or an optionally substituted $C_1$-$C_{20}$ alkyl, $C_2$-$C_{20}$ alkenyl, $C_1$-$C_{20}$ haloalkyl, $C_2$-$C_{20}$ haloalkenyl, or $C_6$-$C_{10}$ aryl; and X is a carboxylate anion.

As used herein, the phrase "$C_1$-$C_{10}$ alkyl group" refers to a chemical substituent comprising from 1 to 10 (i.e., 1, 2, 3, 4, 5, 6, 7, 8, 9, or 10) carbon atoms. The $C_1$-$C_{10}$ alkyl group can be saturated, unsaturated when the alkyl group is $C_2$-$C_{10}$ (i.e., alkenyl), branched, straight-chained, cyclic when the alkyl group is $C_3$-$C_{10}$, or a combination thereof. An exemplary list of $C_1$-$C_{10}$ alkyl or $C_2$-$C_{10}$ alkenyl groups includes methyl, ethyl, n-propyl, iso-propyl, n-butyl, sec-butyl, tert-butyl, n-pentyl, sec-pentyl, neo-pentyl, hexyl, heptyl, octyl, nonyl, cyclopentyl, cyclohexyl, propenyl, 2-butenyl, 3-butenyl, 2-pentenyl, 3-pentenyl, or 4-pentenyl. In certain embodiments, the $C_1$-$C_{10}$ alkyl or $C_2$-$C_{10}$ alkenyl group is further substituted, e.g., with one or more alkyl substituents, aryl substituents, heteroatoms, e.g., O, S, or N, or any combinations thereof. In certain embodiments, A is —O—, —CH$_2$—, or —NH—.

As used herein, the term "substituted" means that one or more hydrogens on the designated atom or group are replaced with another group provided that the designated atom's normal valence is not exceeded. For example, when the substituent is oxo (i.e., =O), then two hydrogens on the carbon atom are replaced. Combinations of substituents are permissible provided that the substitutions do not significantly adversely affect synthesis or use of the curing agent.

R is a $C_1$-$C_6$ alkylene chain, wherein the hydroxyl group can be present attached to any of the carbon atoms of the alkylene chain. As used herein, the phrase "$C_1$-$C_6$ alkylene chain" refers to a divalent alkyl chain (i.e., capable of connecting to two different atoms, for example, a nitrogen atom and an oxygen atom) containing from one to six carbon atoms. The $C_1$-$C_6$ alkylene chain can be saturated, branched, straight-chained, cyclic when the chain is $C_3$-$C_6$ alkylene, or a combination thereof. The hydroxyl group can be attached to any of the carbon atoms of the $C_1$-$C_6$ alkylene chain such that the hydroxyl group forms a primary alcohol, secondary alcohol, or tertiary alcohol. In certain embodiments, the hydroxyl group is attached to the $C_1$-$C_6$ alkylene chain such that the hydroxyl group forms a primary alcohol.

$R_1$ and $R_2$ are each independently hydrogen, hydroxyl, or an optionally substituted $C_1$-$C_{20}$ alkyl, $C_2$-$C_{20}$ alkenyl, $C_1$-$C_{20}$ haloalkyl, $C_2$-$C_{20}$ haloalkenyl, or $C_6$-$C_{10}$ aryl. As used herein, the phrase "$C_1$-$C_{20}$ alkyl" refers to a chemical substituent comprising from 1 to 20 (i.e., 1, 2, 3, 4, 5, 6, 7, 8, 9, 10, 11, 12, 13, 14, 15, 16, 17, 18, 19, or 20) carbon atoms. The $C_1$-$C_{20}$ alkyl group can be saturated, unsaturated (i.e., $C_2$-$C_{20}$ alkenyl), branched, straight-chained, cyclic when the alkyl group is $C_3$-$C_{20}$, or a combination thereof. An exemplary list of $C_1$-$C_{20}$ alkyl or $C_2$-$C_{20}$ alkenyl groups is methyl, ethyl, n-propyl, iso-propyl, n-butyl, sec-butyl, tert-butyl, n-pentyl, sec-pentyl, neo-pentyl, hexyl, heptyl, octyl, nonyl, cyclopentyl, cyclohexyl, propenyl, 2-butenyl, 3-butenyl, 2-pentenyl, 3-pentenyl, or 4-pentenyl. In certain embodiments, the $C_1$-$C_{20}$ alkyl or $C_2$-$C_{20}$ alkenyl group is further substituted with one or more alkyl substituents, aryl substituents, heteroatoms, or combinations thereof. As used herein, the phrase "$C_1$-$C_{20}$ haloalkyl" refers to a $C_1$-$C_{20}$ alkyl that has been substituted with one or more halogens (e.g., fluoro, chloro, bromo, iodo). In certain embodiments, $C_1$-$C_{20}$ haloalkyl or $C_2$-$C_{20}$ haloalkenyl is a perfluorinated substituent. As used herein, the phrase "$C_6$-$C_{10}$ aryl" refers to an aromatic chemical substituent comprising from 6 to 10 (i.e., 6, 7, 8, 9, or 10) carbon atoms. In some embodiments, one or more carbon atoms of the $C_6$-$C_{10}$ aryl group can be replaced with a nitrogen atom as long as the aromaticity of the $C_6$-$C_{10}$ aryl group is maintained. An exemplary list of $C_6$-$C_{10}$ aryl groups is phenyl, naphthyl, biphenyl, and pyridyl. In certain embodiments, the $C_6$-$C_{10}$ aryl group is further substituted with one or more alkyl substituents, heteroatoms, or combinations thereof.

As used herein, the terms "independent" and "independently," when referring to one or more constituent (e.g., $R_1$ and/or $R_2$), means that each substituent is individually selected from the list and can be the same or different.

In certain embodiments, the tertiary amine component of the one or more curing agents is of Formula (I) and is selected from N-hydroxypropylpiperidine, N-hydroxyethyl-morpholine, 2-methyl-N-hydroxyethylpiperidine, 1,4-bis(2-hydroxyethyl)piperazine, N-hydroxymethylpiperidine, N-hydroxyethylpiperidine, and combinations thereof.

X is the carboxylate anion of a carboxylic acid comprising from 1 to about 40 carbon atoms. The carboxylate anion can be derived by replacing the acidic hydrogen of any carboxylic acid with a suitable cation. In embodiments, the carboxylic acid comprises from 1 to about 40 carbon atoms, preferably 1 to about 24 carbon atoms. An exemplary list of carboxylic acids is monocarboxylic acids such as tall oil fatty acid (TOFA), oleic acid, acetic acid, propanoic acid, 2-ethylhexanoic acid, decanoic acid, and hexanoic acid, and dimeric acids such as succinic acid, glutaric acid, adipic acid, or pimelic acid. In certain embodiments, the carboxylic acid is acetic acid, hexanoic acid, or tall oil fatty acid.

In certain embodiments, at least one of the one or more curing agents is of Formula (II):

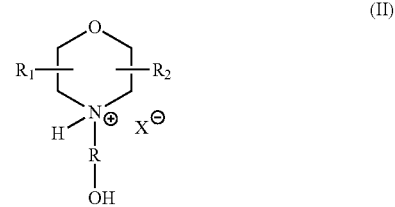

(II)

wherein R is a $C_1$-$C_6$ alkylene chain, wherein the hydroxyl group can be attached to any of the carbon atoms of the alkylene chain; $R_1$ and $R_2$ are each independently hydrogen, hydroxyl, or an optionally substituted $C_1$-$C_{20}$ alkyl, $C_2$-$C_{20}$ alkenyl, $C_1$-$C_{20}$ haloalkyl, $C_2$-$C_{20}$ haloalkenyl, or $C_6$-$C_{10}$ aryl; and X is a carboxylate anion. In preferred embodiments of the one or more curing agents of Formula (II), X is the carboxylate anion of acetic acid, hexanoic acid, or tall oil fatty acid.

In preferred embodiments, at least one of the one or more curing agents is of Formula (III):

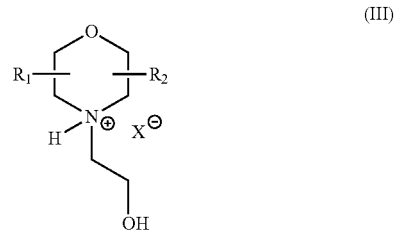

(III)

wherein $R_1$ and $R_2$ are each independently hydrogen, hydroxyl, or an optionally substituted $C_1$-$C_{20}$ alkyl, $C_2$-$C_{20}$ alkenyl, $C_1$-$C_{20}$ haloalkyl, $C_2$-$C_{20}$ haloalkenyl, or $C_6$-$C_{10}$ aryl; and X is a carboxylate anion. In preferred embodiments of the one or more curing agents of Formula (III), X is the carboxylate anion of acetic acid, hexanoic acid, or tall oil fatty acid.

In some embodiments, at least one of the one or more curing agents is ANCAMINE® 2910 Curing Agent, commercially available from Air Products (Allentown, Pa.). In certain embodiments, at least one of the one or more curing agents is ANCAMINE® 2911 Curing Agent, commercially available from Air Products (Allentown, Pa.).

The one or more curing agents can have any suitable intrinsic viscosity prior to curing. In some embodiments, the one or more curing agents have an intrinsic viscosity of from about 1 cps to about 2,000 cps (e.g., from about 1 cps to about 1,000 cps, from about 1 cps to about 500 cps, from about 1 cps to about 200 cps, from about 10 cps to about 2,000 cps, from about 10 cps to about 1,000 cps, from about 10 cps to about 500 cps, from about 10 cps to about 200 cps, from about 30 cps to about 2,000 cps, from about 30 cps to about 1,000 cps, from about 30 cps to about 500 cps, from about 30 cps to about 200 cps, or from about 30 cps to about 60 cps) when stored at a temperature of 22° C. In preferred embodiments, the one or more curing agents have an intrinsic viscosity of from about 30 cps to about 60 cps when stored at a temperature of 22° C.

In some embodiments, the curable composition further comprises a latent curative such as dicyandiamide. The curable composition can comprises any suitable amount of dicyandiamide. For example, the curable composition can comprise from about 0.1 wt. % to about 10 wt. % (e.g., from about 0.1 wt. % to about 5 wt. %, or from about 0.1 wt. % to about 1 wt. %) of dicyandiamide. In certain embodiments, the curable composition is substantially free of dicyandiamide. By "substantially free" it is meant that the curable compositions comprising the one or more curing agents contain less than about 0.1 wt. %, less than about 0.05 wt. %, and in some cases 0 wt. % of dicyandiamide.

While the curable composition can comprise styrene containing compounds (e.g., styrene), in some embodiments, the curable composition is substantially free of styrene containing compounds. As used herein, "substantially free" refers to a curable composition that comprises less than about 0.5 wt. % styrene containing compounds (e.g., less than about 0.1 wt. %, less than about 0.05 wt. %, or less than about 0.01 wt. %). In certain embodiments, the curable composition does not contain a styrene containing compound.

While the curable composition can comprise anhydride containing compounds, in some embodiments, the curable composition is substantially free of anhydride containing compounds. As used herein, "substantially free" refers to a curable composition that comprises less than about 0.5 wt. % anhydride containing compounds (e.g., less than about 0.1 wt. %, less than about 0.05 wt. %, or less than about 0.01 wt. %). In certain embodiments, the curable composition does not contain an anhydride containing compound.

The curable composition can have any suitable intrinsic viscosity prior to curing. In some embodiments, the curable composition has an intrinsic viscosity of from about 5,000 cps to about 20,000 cps (e.g., from about 5,000 cps to about 15,000 cps, from about 5,000 cps to about 12,000 cps, from about 8,000 cps to about 20,000 cps, from about 8,000 cps to about 15,000 cps, from about 8,000 cps to about 14,000 cps, from about 8,000 cps to about 12,000 cps, from about 8,000 cps to about 10,000 cps, or from about 9,000 cps to about 10,000 cps) when stored at a temperature of 22° C. In preferred embodiments, the curable composition has an intrinsic viscosity of from about 9,000 cps to about 10,000 cps when stored at a temperature of 22° C.

In some embodiments, the curable composition further comprises one or more additives selected from pigments, dispersing agents, thixotropes, rheology modifiers, defoamers, fibers, accelerators, fillers, or any combination thereof. The curable composition can comprise any suitable amount of the one or more additives so long as the ratio of the weight percentage of the resin to the weight percentage of the curing agent or curing agents is from about 12:1 to about 15:1. Accordingly, the curable composition can comprise up to about 50 wt. % of the one or more additives, for example, up to about 40 wt. %, up to about 30 wt. %, up to about 20 wt. %, up to about 10 wt. %, or up to about 5 wt. %. In certain embodiments, the curable composition consists essentially of or consists of the resin and the curing agent or curing agents (i.e., contains 0 wt. % of the one or more additives).

The curable composition can be cured at any suitable temperature. For example, the curable composition can be cured at a temperature of about 60° C. to about 85° C. (e.g., about 60° C., about 65° C., about 70° C., about 75° C., about 80° C., or about 85° C.). In embodiments where the curable composition can be cured at a temperature of about 60° C. to about 85° C., the curable composition can be cured using a hot water bladder. In other embodiments, the curable composition requires a temperature of at least about 85° C. (e.g., at least about 85° C., at least about 90° C., at least about 95° C., or at least about 100° C.). In embodiments where the curable composition can be cured at a temperature of at least about 85° C., the curable composition can be cured using steam.

In accordance with an embodiment of the invention, a benefit of the curable composition described herein is the extended pot life (i.e., latency or gel time) at elevated temperatures. As used herein, the phrases "gel time" or "latency" refer to the length of time necessary for the curable composition, or a liner impregnated with the curable composition, to begin to "kick" or "cure". For example, the start of the "kick" or "cure" can be determined by a sudden increase in temperature (e.g., an increase in temperature of at least about 10° C.) of the curable composition and/or the liner impregnated with the curable composition, or by a change in color of the liner impregnated with the curable composition (e.g., the liner turns brown). A longer gel time provides the user more time to insert a cured-in-place liner containing a curable composition into a pipe. Typically, the curable composition described herein has a gel time (i.e., time to gel) of about 12 hours to about 24 hours at a temperature of 21° C. (e.g., about 12 hours to about 20 hours, about 12 hours to about 16 hours, about 16 hours to about 24 hours, about 20 hours to about 24 hours, or about 16 to about 20 hours). In some embodiments, the composition has a gel time of about 14 hours to about 22 hours at a temperature of 21° C. In certain embodiments, the composition has a gel time of about 16 hours to about 20 hours at a temperature of 21° C.

The invention also provides a method of curing a cured-in-place liner, wherein the method comprises: (i) placing the cured-in-place liner in a pipe and (ii) heating the cured-in-place liner, wherein the cured-in-place liner contains a curable composition comprising, consisting essentially of, or consisting of, (a) a resin comprising 4,4'-isopropylidene-diphenol-epichlorohydrin copolymer and (b) one or more curing agents, wherein a ratio of a weight percentage of the resin to a weight percentage of the curing agent or curing agents is from about 12:1 to about 15:1.

The method comprises placing the cured-in-place liner in a pipe. The cured-in-place liner can be placed in the pipe by any suitable method. For example, the liner can be inserted or pulled to a point of repair from an access point upstream of the point of repair or downstream of the point of repair. In preferred embodiments, the cured-in-place liner is inserted or pulled from an access point upstream of the point of repair.

The cured-in-place liner can be made of any suitable material. For example, the cured-in-place liner can be made of felt, polyester, fiberglass, cloth, vinyl, nylon, or any other material suitable for impregnation with the curable composition, or any combination thereof.

The pipe can be any suitable pipe used for any suitable application. For example, the pipe can be used to transfer water, sewage, chemicals, or any combination thereof. The pipe can be any suitable size. For example, the pipe can be from about 1 inch to about 20 feet in diameter, for example, from about 2 inches to about 20 feet, from about 2 inches to about 10 feet, from about 2 inches to about 5 feet, or from about 2 inches to about 1 foot. In preferred embodiments the pipe is from about 2 inches to about 10 feet in diameter.

The method can include heating the cured-in-place liner. The cured-in-place liner can be heated to any suitable temperature. In some embodiments, the cured-in-place liner is heated to a temperature of from about 60° C. to about 85° C. (e.g., about 60° C., about 65° C., about 70° C., about 75° C., about 80° C., or about 85° C.) to begin a curing process. In other embodiments, the cured-in-place liner is heated to a temperature of at least about 85° C. (e.g., at least about 85° C., at least about 90° C., at least about 95° C., or at least about 100° C.) to begin a curing process.

The invention is further illustrated by the following embodiments.

(1) A curable composition comprising, (a) a resin comprising 4,4'-isopropylidenediphenol-epichlorohydrin copolymer and (b) one or more curing agents, wherein a ratio of a weight percentage of the resin to a weight percentage of the curing agent or curing agents is from about 12:1 to about 15:1.

(2) The curable composition of embodiment (1), wherein at least one of the one or more curing agents is of Formula (I):

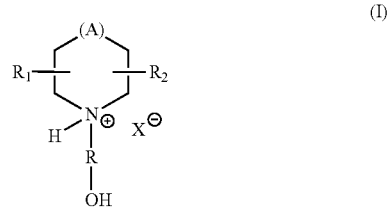

wherein A is —O—, —$CH_2$—, or —NR'—, R' is hydrogen or an optionally substituted $C_1$-$C_{10}$ alkyl or $C_2$-$C_{10}$ alkenyl group; R is a $C_1$-$C_6$ alkylene chain, wherein the hydroxyl group may be attached to any of the carbon atoms of the alkylene chain; $R_1$ and $R_2$ are each independently hydrogen, hydroxyl, or an optionally substituted $C_1$-$C_{20}$ alkyl, $C_2$-$C_{20}$ alkenyl, $C_1$-$C_{20}$ haloalkyl, $C_2$-$C_{20}$ haloalkenyl, or $C_6$-$C_{10}$ aryl; and X is a carboxylate anion.

(3) The curable composition of embodiment (1) or (2), wherein at least one of the one or more curing agents is of Formula (II):

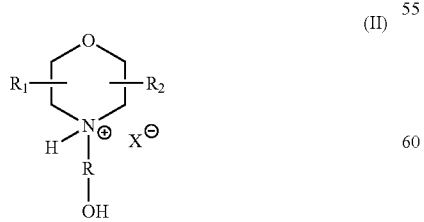

wherein R is a $C_1$-$C_6$ alkylene chain, wherein the hydroxyl group may be attached to any of the carbon atoms of the alkylene chain; $R_1$ and $R_2$ are each independently hydrogen, hydroxyl, or an optionally substituted $C_1$-$C_{20}$ alkyl, $C_2$-$C_{20}$ alkenyl, $C_1$-$C_{20}$ haloalkyl, $C_2$-$C_{20}$ haloalkenyl, or $C_6$-$C_{10}$ aryl; and X is a carboxylate anion.

(4) The curable composition of any one of embodiments (1)-(3), wherein at least one of the one or more curing agents is of Formula (III):

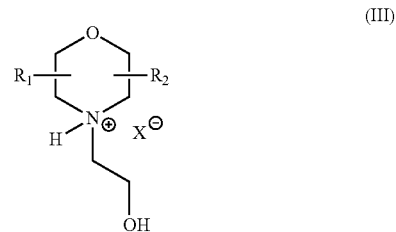

wherein $R_1$ and $R_2$ are each independently hydrogen, hydroxyl, or an optionally substituted $C_1$-$C_{20}$ alkyl, $C_2$-$C_{20}$ alkenyl, $C_1$-$C_{20}$ haloalkyl, $C_2$-$C_{20}$ haloalkenyl, or $C_6$-$C_{10}$ aryl; and X is a carboxylate anion.

(5) The curable composition of any one of embodiments (2)-(4), wherein X is the carboxylate anion of a carboxylic acid comprising from 1 to about 40 carbon atoms.

(6) The curable composition of any one of embodiments (1)-(5), wherein the ratio of the weight percentage of the resin to the weight percentage of the curing agent or curing agents is from about 12:1 to about 14:1.

(7) The curable composition of embodiment (6), wherein the ratio of the weight percentage of the resin to the weight percentage of the curing agent or curing agents is about 12:1.

(8) The curable composition of any one of embodiments (1)-(7), wherein the composition requires a temperature of at least about 85° C. to begin a curing process.

(9) The curable composition of any one of embodiments (1)-(7), wherein the composition begins a curing process at a temperature of about 60° C. to about 85° C.

(10) The curable composition of any one of embodiments (1)-(9), wherein the composition has a gel time of about 12 hours to about 24 hours at a temperature of 21° C.

(11) The curable composition of embodiment (10), wherein the composition has a gel time of about 14 hours to about 22 hours at a temperature of 21° C.

(12) The curable composition of embodiment (11), wherein the composition has a gel time of about 16 hours to about 20 hours at a temperature of 21° C.

(13) A curable composition comprising, (a) a resin comprising 4,4'-isopropylidenediphenol-epichlorohydrin copolymer and (b) one or more curing agents wherein at least one of the one or more curing agents is of Formula (II):

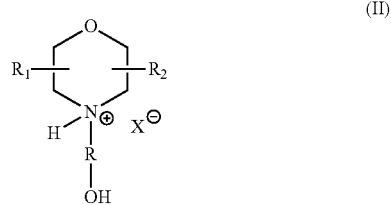

wherein R is a $C_1$-$C_6$ alkylene chain, wherein the hydroxyl group may be attached to any of the carbon atoms of the alkylene chain; $R_1$ and $R_2$ are each independently hydrogen, hydroxyl, or an optionally substituted $C_1$-$C_{20}$ alkyl, $C_2$-$C_{20}$ alkenyl, $C_1$-$C_{20}$ haloalkyl, $C_2$-$C_{20}$ haloalkenyl, or $C_6$-$C_{10}$ aryl; and X is a carboxylate anion, wherein a ratio of a weight percentage of the resin to a weight percentage of the curing agent or curing agents is from about 12:1 to about 15:1.

(14) The curable composition of embodiment (13), wherein at least one of the one or more curing agents is of Formula (III):

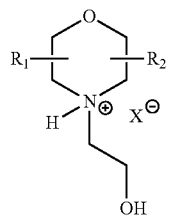

(III)

wherein $R_1$ and $R_2$ are each independently hydrogen, hydroxyl, or an optionally substituted $C_1$-$C_{20}$ alkyl, $C_2$-$C_{20}$ alkenyl, $C_1$-$C_{20}$ haloalkyl, $C_2$-$C_{20}$ haloalkenyl, or $C_6$-$C_{10}$ aryl; and X is a carboxylate anion.

(15) The curable composition of embodiment (13) or (14), wherein X is the carboxylate anion of a carboxylic acid comprising from 1 to about 40 carbon atoms.

(16) The curable composition of any one of embodiments (13)-(15), wherein the ratio of the weight percentage of the resin to the weight percentage of the curing agent or curing agents is from about 12:1 to about 14:1.

(17) The curable composition of embodiment (16), wherein the ratio of the weight percentage of the resin to the weight percentage of the curing agent or curing agents is about 12:1.

(18) The curable composition of any one of embodiments (13)-(17), wherein the composition requires a temperature of at least about 85° C. to begin a curing process.

(19) The curable composition of any one of embodiments (13)-(17), wherein the composition begins a curing process at a temperature of about 60° C. to about 85° C.

(20) The curable composition of any one of embodiments (13)-(19), wherein the composition has a gel time of about 12 hours to about 24 hours at a temperature of 21° C.

(21) The curable composition of embodiment (20), wherein the composition has a gel time of about 14 hours to about 22 hours at a temperature of 21° C.

(22) The curable composition of embodiment (21), wherein the composition has a gel time of about 16 hours to about 20 hours at a temperature of 21° C.

(23) A method of curing a cured-in-place liner, wherein the method comprises: (i) placing the cured-in-place liner in a pipe and (ii) heating the cured-in-place liner, wherein the cured-in-place liner contains a curable composition comprising, (a) a resin comprising 4,4'-isopropylidenediphenol-epichlorohydrin copolymer and (b) one or more curing agents, wherein a ratio of a weight percentage of the resin to a weight percentage of the curing agent or curing agents is from about 12:1 to about 15:1.

(24) The method of embodiment (23), wherein at least one of the one or more curing agents is of Formula (I):

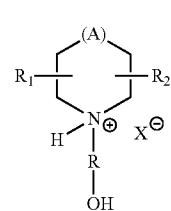

(I)

wherein A is —O—, —$CH_2$—, or —NR'—, R' is hydrogen or an optionally substituted $C_1$-$C_{10}$ alkyl or $C_2$-$C_{10}$ alkenyl group; R is a $C_1$-$C_6$ alkylene chain, wherein the hydroxyl group may be attached to any of the carbon atoms of the alkylene chain; $R_1$ and $R_2$ are each independently hydrogen, hydroxyl, or an optionally substituted $C_1$-$C_{20}$ alkyl, $C_2$-$C_{20}$ alkenyl, $C_1$-$C_{20}$ haloalkyl, $C_2$-$C_{20}$ haloalkenyl, or $C_6$-$C_{10}$ aryl; and X is a carboxylate anion.

(25) The method of embodiment (23) or (24), wherein at least one of the one or more curing agents is of Formula (II):

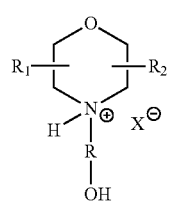

(II)

wherein R is a $C_1$-$C_6$ alkylene chain, wherein the hydroxyl group may be attached to any of the carbon atoms of the alkylene chain; $R_1$ and $R_2$ are each independently hydrogen, hydroxyl, or an optionally substituted $C_1$-$C_{20}$ alkyl, $C_2$-$C_{20}$ alkenyl, $C_1$-$C_{20}$ haloalkyl, $C_2$-$C_{20}$ haloalkenyl, or $C_6$-$C_{10}$ aryl; and X is a carboxylate anion.

(26) The method of any one of embodiments (23)-(25), wherein at least one of the one or more curing agents is of Formula (III):

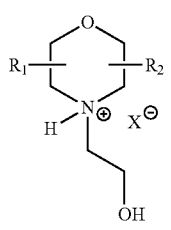

(III)

wherein $R_1$ and $R_2$ are each independently hydrogen, hydroxyl, or an optionally substituted $C_1$-$C_{20}$ alkyl, $C_2$-$C_{20}$ alkenyl, $C_1$-$C_{20}$ haloalkyl, $C_2$-$C_{20}$ haloalkenyl, or $C_6$-$C_{10}$ aryl; and X is a carboxylate anion.

(27) The method of any one of embodiments (23)-(26), wherein the ratio of the weight percentage of the resin to the weight percentage of the curing agent or curing agents is from about 12:1 to about 14:1.

(28) The method of embodiment (27), wherein the ratio of the weight percentage of the resin to the weight percentage of the curing agent or curing agents is about 12:1.

(29) The method of any one of embodiments (23)-(28), wherein the cured-in-place liner is heated to a temperature of at least about 85° C.

(30) The method of any one of embodiments (23)-(28), wherein the cured-in-place liner is heated to a temperature of about 60° C. to about 85° C.

EXAMPLE

The following example further illustrates the invention but, of course, should not be construed as in any way limiting its scope.

This example demonstrates the effect of ratio of wt. % of resin to curing agent on pot life, exhibited by a curable composition at 21° C., as measured by the gel time of the curable composition.

Curable Compositions 1-6 as set forth in Table 1 below were prepared using the ratios of resin (EPON™ Resin 828) to curing agent (ANCAMINE® 2910 Curing Agent). The resulting mixtures were put in a liner and placed at a temperature of 21° C. until a sudden change in temperature (i.e., a temperature change of at least 10° C.) of the curable compositions was observed. The pot life (i.e., time to gel) results are set forth in Table 1 and are plotted in the FIGURE.

TABLE 1

Curable Composition vs. Pot Life at 21° C.

| Curable Composition | Ratio of wt. % of Resin to Curing Agent | Pot Life at 21° C. (hours) |
|---|---|---|
| 1 (Comparative) | 10:1 | 9 |
| 2 (Comparative) | 11:1 | 12 |
| 3 (Inventive) | 12:1 | 18 |
| 4 (Inventive) | 15:1 | 22 |
| 5 (Comparative) | 18:1 | 30 |
| 6 (Comparative) | 20:1 | 38 |

As is apparent from the results set forth in Table 1 and the FIGURE, the pot life at 21° C. is linearly correlated with the ratio of wt. % of resin to curing agent. However, Comparative Curable Compositions 1 and 2 had too low of a viscosity to be useful for cured-in-place pipe applications. For example, when fitting a pipe with a liner containing comparative Curable Compositions 1 and 2, the curable composition drained to the bottom hemisphere of the pipe, resulting in inadequate fittings. Comparative Curable Compositions 5 and 6 had too high of a viscosity to be useful for cured-in-place pipe applications. For example, Comparative Curable Compositions 5 and 6 were too viscous to be efficiently pumped into a liner, making production difficult and their use in cured-in-place pipe applications unlikely.

Curable Compositions 3 and 4 with ratios of wt. % of resin to curing agent of 12:1 and 15:1, respectively, provided adequate pot life times (i.e., 18 hours and 22 hours, respectively) and have a viscosity suitable for filling a liner, while maintaining structure for cured-in-place pipe applications.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The terms "about" and "around," as used herein to modify a numerical value, indicate a close range surrounding the numerical value. Thus, if "X" is the value, "about X" or "around X" indicates a value of from 0.9X to 1.1X, e.g., from 0.95X to 1.05X or from 0.99X to 1.01X. A reference to "about X" or "around X" specifically indicates at least the values X, 0.95X, 0.96X, 0.97X, 0.98X, 0.99X, 1.01X, 1.02X, 1.03X, 1.04X, and 1.05X. Accordingly, "about X" and "around X" are intended to teach and provide written description support for a claim limitation of, e.g., "0.98X."

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of curing a cured-in-place liner, wherein the method comprises:
   (i) placing the cured-in-place liner in a pipe and
   (ii) heating the cured-in-place liner,
wherein the cured-in-place liner contains a curable composition comprising:
   (a) a resin comprising 4,4'-isopropylidenediphenol-epichlorohydrin copolymer and
   (b) one or more curing agents of Formula (I):

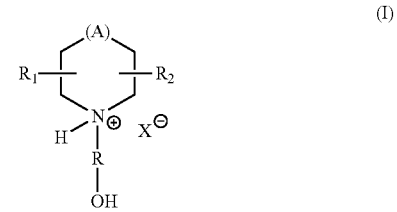

wherein A is —CH$_2$—;

R is a C$_1$-C$_3$ alkylene chain, wherein the hydroxyl group may be attached to any of the carbon atoms of the alkylene chain;

R$_1$ and R$_2$ are each independently hydrogen; and

X is a carboxylate anion, wherein a ratio of a weight percentage of the resin to a weight percentage of the curing agent or curing agents of formula (I) is from about 12:1 to about 15:1;

(c) a diluent which is a monofunctional epoxide selected from C$_{12}$-C$_{14}$ glycidyl ethers;

(d) a filler;

(e) a rheology modifier; and (f) a defoamer;

wherein said curable composition has a gel time of about 12 to about 24 hours when cured in a cured-in-place liner at 21° C.

2. The method of claim 1, wherein X is the carboxylate anion of a carboxylic acid comprising from 1 to about 40 carbon atoms.

3. The method of claim 1, wherein the ratio of the weight percentage of the resin to the weight percentage of the curing agent or curing agents of formula (I) is from about 12:1 to about 14:1.

4. The method of claim 3, wherein the ratio of the weight percentage of the resin to the weight percentage of the curing agent or curing agents of formula (I) is about 12:1.

5. The method of claim 1, wherein the composition requires a temperature of at least about 85° C. to begin a curing process.

6. The method of claim 1, wherein the composition begins a curing process at a temperature of about 60° C. to about 85° C.

7. The method of claim 1, wherein the composition has a gel time of about 14 hours to about 22 hours at a temperature of 21° C.

8. The method of claim 7, wherein the composition has a gel time of about 16 hours to about 20 hours at a temperature of 21° C.

9. The method of claim 1, wherein the curing agent is a carboxylate of an amine selected from N-hydroxypropylpiperidine, N-hydroxymethylpiperidine, N-hydroxyethylpiperidine, and combinations thereof.

10. The method of claim 9, wherein the carboxylate is a carboxylate anion of an acid selected from tall oil fatty acid (TOFA), oleic acid, acetic acid, propanoic acid, 2-ethylhexanoic acid, decanoic acid, and hexanoic acid, succinic acid, glutaric acid, adipic acid, and pimelic acid.

11. The method of claim 9, wherein a ratio of a weight percentage of the resin to a weight percentage of the curing agent or curing agents of formula (I) is from 12:1 to 15:1.

12. The method of claim 9, wherein a ratio of a weight percentage of the resin to a weight percentage of the curing agent or curing agents of formula (I) is from 12:1 to 13:1.

13. The method of claim 9, wherein the curing agent is a carboxylate of an amine selected from N-hydroxymethylpiperidine, N-hydroxyethylpiperidine, and combinations thereof.

14. The method of claim 13, wherein a ratio of a weight percentage of the resin to a weight percentage of the curing agent or curing agents of formula (I) is from 12:1 to 13:1.

15. The method of claim 13, wherein the curing agent is a carboxylate of N-hydroxyethylpiperidine.

16. The method of claim 15, wherein a ratio of a weight percentage of the resin to a weight percentage of the curing agent or curing agents of formula (I) is from 12:1 to 13:1.

17. The method of claim 15, wherein the cured-in-place liner is heated to a temperature of at least about 85° C.

18. The method of claim 17, wherein the cured-in-place liner is heated to a temperature of about 60° C. to about 85° C.

19. The method of claim 1, wherein the cured-in-place liner is heated to a temperature of at least about 85° C.

20. The method of claim 19, wherein the cured-in-place liner is heated to a temperature of about 60° C. to about 85° C.

* * * * *